United States Patent
Lei et al.

(10) Patent No.: US 12,286,750 B2
(45) Date of Patent: Apr. 29, 2025

(54) METHOD FOR PREPARING FLUFF PULP FROM BAMBOOS AND FLUFF PULP PREPARED THEREBY

(71) Applicant: SOUTH CHINA UNIVERSITY OF TECHNOLOGY, Guangzhou (CN)

(72) Inventors: Yichao Lei, Guangzhou (CN); Mengdi Wang, Guangzhou (CN); Hailong Li, Guangzhou (CN); Jian Hu, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/703,721

(22) PCT Filed: Oct. 31, 2022

(86) PCT No.: PCT/CN2022/128831
§ 371 (c)(1),
(2) Date: Apr. 23, 2024

(87) PCT Pub. No.: WO2023/184969
PCT Pub. Date: Oct. 5, 2023

(65) Prior Publication Data
US 2024/0328083 A1   Oct. 3, 2024

(30) Foreign Application Priority Data

Mar. 31, 2022 (CN) .......................... 202210333279.X

(51) Int. Cl.
| | |
|---|---|
| *D21C 1/06* | (2006.01) |
| *D21C 3/02* | (2006.01) |
| *D21C 9/02* | (2006.01) |
| *D21C 9/16* | (2006.01) |
| *D21C 11/00* | (2006.01) |
| *D21C 11/02* | (2006.01) |

(52) U.S. Cl.
CPC ............... *D21C 1/06* (2013.01); *D21C 3/022* (2013.01); *D21C 3/026* (2013.01); *D21C 9/02* (2013.01); *D21C 9/163* (2013.01); *D21C 11/0014* (2013.01); *D21C 11/0035* (2013.01); *D21C 11/02* (2013.01)

(58) Field of Classification Search
CPC .......... D21C 1/06; D21C 3/022; D21C 3/026; D21C 9/02; D21C 9/163; D21C 11/0014; D21C 11/0035; D21C 11/02
See application file for complete search history.

(56) References Cited

U.S. PATENT DOCUMENTS

| | | | | |
|---|---|---|---|---|
| 2008/0295982 A1* | 12/2008 | Lee | .......................... | D21C 5/00 162/60 |
| 2012/0180964 A1* | 7/2012 | Heinricher | ............. | D21H 11/12 162/100 |
| 2015/0136345 A1* | 5/2015 | Tunc | ........................ | D21C 3/04 162/14 |
| 2021/0189652 A1* | 6/2021 | White | ....................... | D21D 5/24 |
| 2022/0081833 A1* | 3/2022 | Vinther | ..................... | D21C 3/02 |

FOREIGN PATENT DOCUMENTS

| | | | | |
|---|---|---|---|---|
| CN | 101748630 | | 6/2010 | |
| CN | 102677504 | | 9/2012 | |
| CN | 103382671 | | 11/2013 | |
| CN | 104195868 | | 12/2014 | |
| CN | 105113307 | | 12/2015 | |
| CN | 113249999 | | 8/2021 | |
| CN | 114687234 | | 7/2022 | |
| WO | 2008074220 | | 6/2008 | |
| WO | WO-2013004909 | A1 * | 1/2013 | ............. D21C 9/004 |
| WO | WO-2020038823 | A1 * | 2/2020 | ............. D21D 99/00 |

OTHER PUBLICATIONS

Yong Li et al., "New techniques for pulping process of bamboo dissolving pulp", Journal of Beijing Forestry University, Jan. 2009, with English abstract, pp. 165-168, vol. 31, Supp . 1.
Li-Juan Chen et al., "Fiber morphology of six sympodial bamboos in Sichuan", Journal of Northwest A&F University (Nat.Sci.Ed.), May 2015, with English abstract, pp. 79-86, vol. 43, No. 5.
"International Search Report (Form PCT/ISA/210) of PCT/CN2022/128831", mailed on Jan. 6, 2023, with English translation thereof, pp. 1-6.

* cited by examiner

*Primary Examiner* — Anthony Calandra
(74) *Attorney, Agent, or Firm* — JCIPRNET

(57) ABSTRACT

Discloses are a method for preparing fluff pulp from bamboos, and the fluff pulp prepared thereby. The method comprises the following steps: treating the bamboos with high-concentration alkali at a relatively mild temperature, after a certain period of treatment, replacing a treatment liquid for separating hemicellulose with a weak black liquor; Kraft cooking the treated bamboos to obtain unbleached bamboo pulp, removing rejects in the unbleached bamboo pulp by using a slotted screen; then removing miscellaneous cells by using a microporous sieve; carrying out two stages of oxygen delignification on the screened pulp; carrying out ECF bleaching treatment of a $D_0EpD_1P$ process; and finally obtaining the bamboo fluff pulp which has high whiteness, low DCM extract content, low ash content and long fiber length, contains 4.2-4.6 million fibers per gram, and has relatively high bulkiness.

5 Claims, No Drawings

METHOD FOR PREPARING FLUFF PULP FROM BAMBOOS AND FLUFF PULP PREPARED THEREBY

CROSS-REFERENCE TO RELATED APPLICATION

This application is a 371 application of International PCT application serial no. PCT/CN2022/128831 filed on Oct. 31, 2022, which claims the priority benefit of China application no. 202210333279.X filed on Mar. 31, 2022. The entirety of each of the above mentioned patent applications is hereby incorporated by reference herein and made a part of this specification.

TECHNICAL FIELD

The present invention belongs to the scientific field of biorefinery and pulping and papermaking, and specifically relates to a method for preparing fluff pulp from bamboos and the fluff pulp prepared thereby.

DESCRIPTION OF RELATED ART

China is a country with a shortage of forests, and the fiber raw materials of softwood are even more scarce. Generally, the logging cycle of softwood is at least 20 years. Currently, China implements strict ecological environment protection policies and strictly prohibits the logging of natural forests, so there is basically no softwood raw material in China to produce fluff pulp. However, China has abundant bamboo resources, and bamboo fibers belong to the medium-length fiber category, with a length between softwood pulp and hardwood pulp, and fiber length to width ratio between 110 and 140, which is better than that of hardwood and similar to that of softwood. Bamboo fibers have good pulping and papermaking properties and are one of the better non-wood papermaking fiber raw materials. Bamboos have a logging cycle of 2-3 years and are a fast-growing plant. According to data, bamboo forests of the same area absorb four times more $CO_2$ and release 35% more oxygen than wood. Using bamboos to prepare fluff pulp meets carbon emission reduction policies.

Fluff pulp is required to meet the following characteristics: first, the fiber length should be long. Long fibers can enable the final product to achieve relatively high bulk and have the function of quickly absorbing and dispersing liquids. Softwood fibers have a long length (about 3-4 mm), so internationally, fluff pulp is mostly produced from softwood raw materials. Second, it is necessary to have a relatively large coarseness, which refers to the weight of fibers per unit length. The thicker the fiber cell wall and the larger the wall thickness to lumen diameter ratio, the greater the coarseness of the fiber. Fibers with a larger coarseness are relatively stiff, resulting in higher bulk when making pulp boards, less power consumption during defibration, and less damage to fibers. The final product has a high network porosity of interwoven fibers, good liquid absorption performance, and good core pad integrity. Generally, mature wood has a larger coarseness than juvenile wood, autumn wood is thicker than spring wood, and the fibers of southern pine and loblolly pine have thick cell walls. Third, fluff pulp requires a low content of fine fibers, as fine fibers can block the gaps between fibers and affect water absorption. An important indicator of fluff pulp is the number of fibers per gram of pulp. The smaller the indicator, the better. The shorter the fiber, the higher the content of fine fibers, and the larger the indicator. The fact that the fiber cells of softwood are mainly tracheids, accounting for 90-95% of the total number of softwood cells, and there are fewer parenchyma cells is also one of the reasons why fluff pulp is mainly produced from softwood raw materials. Fourth, fluff pulp requires a low content of organic solvent extractives, as a high extractive content can reduce the water absorption and speed of fibers. Generally, the solvent extractive content of kraft pulping is lower than that of sulfite pulping, so most fluff pulp process methods use kraft pulping. Fifth, the liquid absorption performance requires a fast liquid absorption speed and a large liquid absorption volume. The liquid absorption speed is closely related to the extractive content, lignin content, and ash content of fluff pulp. The lower the above indicators, the faster the liquid absorption speed. Therefore, fluff pulp requires a higher whiteness and lower extractive and ash contents. The liquid absorption volume mainly depends on the length and coarseness of fibers, and fluffy pulp with high bulkiness have a large liquid absorption volume.

The manufacturing methods of fluff pulp include kraft method, acidic sulfite method, and chemi-thermomechanical pulp, where kraft method accounts for more than 90%, with a low pulp extractive content, a fast liquid absorption speed and good fiber strength as its main advantages, and a core pad prepared thereby has a good integrity; the main advantages of sulfite pulping are a low hemicellulose content in a pulp, low burst resistance of pulp boards, and low power consumption required for defibration, but it has a high extractive content and a low liquid absorption speed; the main advantages of chemi-thermomechanical pulp are a high yield, a low cost, and high pulp bulkiness due to high fiber curling, but it has high lignin and extractive contents and a low liquid absorption speed. The vast majority of the raw materials used in fluff pulp are softwood raw materials with long fibers, with a few using hardwood and non-wood materials. The main reason is that softwood raw materials have long fibers and fewer parenchyma cells, resulting in a fluff pulp core pad with good integrity, a large liquid absorption volume, and a fast liquid absorption speed. There are a few international producers of hardwood fluff pulp, mainly used for the core layers of low-end disposable daily necessities, with a low cost and a cheap price as advantages, but with other extremely poor indicators. Special non-wood materials can also be used to prepare fluff pulp, such as cotton, hemp, and flax fibers. These fibers have a common characteristic of being longer in length and are generally used in the textile industry. The wastes from textile production can be used to prepare fluff pulp, but resources are limited, which is not in the mainstream direction. Bamboos, a non-wood raw material, is a promising raw material for preparing fluff pulp. The fiber length of bamboo raw materials is between those of softwood and hardwood. The main advantages of bamboos are its short growth cycle and abundant raw materials. One of the biggest advantages is that the bamboo fiber has large wall thickness to lumen diameter ratio, which endows bamboo fibers with excellent rigidity properties. The diameter of bamboo fibers is small, only ⅓-½ of softwood fibers. Therefore, the network structure formed by bamboo fibers has small capillaries, which can quickly absorb liquids. Due to the high rigidity of bamboo fibers, these fine and rigid capillaries can well maintain liquids and withstand certain pressure. Thus, bamboo fibers are a kind of good raw material for preparing fluff pulp.

Taking bamboo raw materials as an example, *Neosinocalamus affinis* is a *Dendrocalamus bamboo* species, belonging to a typical medium-sized clustered bamboo, mainly distributed in Sichuan, Guizhou, and northwestern Yunnan. The main chemical components of Sichuan *Neosinocalamus affinis* are as follows: 51.28% cellulose content, 19.82% hemicellulose content, 21.75% lignin content, 2.34% ash content, and 3.36% benzyl alcohol extractive content. Based on the above chemical composition, *Neosinocalamus affinis* is a good pulp raw material. The fiber length distribution of *Neosinocalamus affinis* is uneven, with longer fiber cells towards the outer layer and shorter fiber lengths towards the inner layer. The fiber length ranges from 1 to 2.5 mm and the fiber width ranges from 19.2 to 19.5 μm, the fiber length to width ratio ranges from 50 to 125, and the average lumen diameter is 5.30 to 8.79 μm. The cell wall is relatively thick, ranging from 6.70 to 8.10 μm. The wall thickness to lumen diameter ratio is 1.60 to 2.58. Compared with softwood, such as southern *Pinus massoniana* (autumn wood), the average fiber length is 3.76 mm, the average fiber width is 34.96 μm, the fiber length to width ratio is 107.57, the fiber wall thickness 6.28 μm, the fiber lumen diameter is 21.45 μm, and the fiber wall thickness to lumen diameter ratio is 0.63. From the above data, it can be seen that the fibers of *Neosinocalamus affinis* have thicker cell walls, larger wall thickness to lumen diameter ratios, and higher fiber length to width ratios, all of which are necessary for preparing high-quality fluff pulp. Therefore, *Neosinocalamus affinis* is a potential raw material for high-quality fluff pulp. Many bamboo raw materials have the same fiber morphology as *Neosinocalamus affinis*, such as *Bambusa intermedia, Dendrocalamus membranaceus,* and *Lingnania chungii*, etc. (Lijuan Chen, Chaoyan Zhang, Yongping Lai, et al., Fiber morphology of six sympodial bamboos in Sichuan, Journal of Northwest A&F University (Natural Science Edition), Volume 43, Issue 5, May 2015, 79-86). Bamboo fiber cells account for 40% to 60% of the total cell count (area method) and are mostly present in vascular bundles. Bamboos also contain a large number of non-fiber cells, such as parenchyma cells, stone cells, epidermal cells, and other cells, with a proportion of 20% to 35%. Due to the small length, large lumen diameter, thin wall, and easy breakage of parenchyma cells, they exist in the form of fine fibers in pulp. These parenchyma cells are extremely detrimental to fluff pulp. As mentioned earlier, these fine fibers can clog the capillaries of the fiber network, reducing the liquid absorption performance. In addition, the composition of bamboo hemicellulose is mainly composed of xylan. During the kraft pulping process, xylan have a certain degree of alkali resistance. Traditional kraft bamboo pulp usually contains 12-18% hemicellulose. The content of hemicellulose is high, which increases the hydrogen bonding between fibers during drying. When making pulp boards, the density is high, which is not conducive to dry defibration. For fluff pulp, it is desired that the hemicellulose content is as low as possible. Moreover, the ash content of bamboo raw materials is relatively high. If the ash content of pulp is high, it will also affect its liquid absorption performance. These are all problems that must be addressed in preparing fluff pulp from bamboos.

SUMMARY

Technical Problems

Solutions to the Problems

Technical Solutions

The purpose of the present invention is to provide a method for preparing fluff pulp from bamboos and the fluff pulp prepared thereby. The present invention uses bamboos as raw materials. First, a high concentration sodium hydroxide solution is used to perform alkaline extraction on the bamboo raw materials at a mild temperature. The main purpose is to extract hemicellulose from the raw materials, and reduce the contents of hemicellulose and ash in pulp, so as to reduce the binding force between fibers during fiber drying, lower the density of the pulp board, and lower the burst resistance of the pulp board. Then the kraft process is used for cooking. The pulp after cooking is first screened and cleaned to remove coarse rejects and sandstones, and then fine fibers and parenchyma cells are screened out through a microporous screen to obtain relatively long bamboo fibers. Next, oxygen delignification and ECF bleaching are performed to completely remove lignin from the raw materials, improve the hydrophilicity and water absorption value of the fibers, and produce high-performance bamboo fluff pulp. The present invention also separates and applies extracted hemicellulose, laying a foundation for the comprehensive utilization of hemicellulose. The present invention recycles the screened coarse rejects and fine fibers, which can be used for preparing packaging paper.

The present invention first utilizes a high concentration sodium hydroxide solution to extract hemicellulose under mild conditions and reduces the silicon content in the raw materials. Hemicellulose is acidic in high concentration alkali solutions, and due to its small relative molecular mass, it is easy to dissolve in alkali solutions. In addition, less cellulose and lignin are dissolved out in the alkaline extraction under mild conditions, allowing for selective dissolution of hemicellulose. The hemicellulose dissolved out has large relative molecular mass, which is beneficial for the subsequent separation and application of hemicellulose. Additionally, high concentration alkali solutions are also beneficial for silica in bamboo raw materials to be dissolved out, which can reduce the ash content in pulp. The use of sodium hydroxide solution for extraction does not have a negative impact on kraft pulping, as the chemicals in kraft pulping contain sodium hydroxide. After the raw materials are extracted, they can be directly added with cooking chemicals without washing for subsequent operations, and the entire extraction and cooking processes can be completed in one digester. Currently, cooking digesters with replacement cooking can achieve the above extraction and cooking processes. The cooked pulp is first washed, and then screened and cleaned to remove coarse rejects and sandstones. Then a microporous screen is used to remove fine fibers and parenchyma cells. The fiber length distribution of bamboo raw materials is uneven, and some shorter fibers and parenchyma cells must be separated; otherwise, they will block the pores of the core pad and affect the water absorption performance. The microporous screen can effectively separate fine fibers and parenchyma cells, while retaining long fibers. After screening out fine fibers and parenchyma cells in the pulp, ECF bleaching is performed to completely remove lignin and improve the hydrophilicity of the raw materials, ultimately obtaining qualified fluff pulp.

The hemicellulose extracted by high concentration alkali can be separated and used. The ultrafiltration method can be used for separation. The difference in the relative molecular mass of hemicellulose and sodium hydroxide is used for separation. The separated hemicellulose can be used in other fields, such as hydrogel, papermaking additives, furfural, etc. The alkali liquor is returned to the system for recycling. The screened coarse rejects and fine fibers can be used as raw materials for packaging paper.

To achieve the above-mentioned invention objectives, the present invention adopts the following technical solutions.

The present invention provides a method for preparing fluff pulp from bamboos, comprising the following steps.

(1) alkali treatment of bamboos: treating a bamboo raw material and alkali liquor in a cooking digester to obtain a treatment liquid.

(2) separation of the treatment liquid: replacing the treatment liquid in the step (1) with a weak black liquor, and storing a replaced treatment liquid separately in a container for later use.

(3) cooking of treated bamboos: replacing the weak black liquor with a warm black liquor, wherein the weak black liquor enters an original weak black liquor tank, then replacing the warm black liquor with a hot black liquor, wherein the warm black liquor enters a warm black liquor tank, after the replacement is completed, adding white liquor for cooking, after the cooking is completed, replacing the hot black liquor with the weak black liquor, wherein the hot black liquor enters a hot black liquor tank, and the warm black liquor enters the warm black liquor tank, and when a temperature of a pulp decreases, using a pump to pump the pulp to a pulp storage tower.

washing of the pulp: washing the pulp in the pulp storage tower of the step (3) to obtain a washed pulp and a washed weak black liquor, sending the washed pulp to a washed pulp tower, and sending the washed weak black liquor to the weak black liquor tank.

(5) screening and cleaning of the pulp: screening the washed pulp to obtain a screened pulp and screened rejects, sending the screened pulp to a screened pulp tower for storage, re-screening the screened rejects to obtain an accepted pulp and tail rejects, reusing the accepted pulp, and collecting the tail rejects for later use, followed by cleaning to obtain a screened and cleaned pulp.

(6) screening of parenchyma cells: removing parenchyma cells and fine fibers from the screened and cleaned pulp using a microporous screen, sending a pulp with parenchyma cells and fine fibers removed to a long fiber pulp tower for storage, and sending a pulp containing parenchyma cells and fine fibers to a parenchyma cell pulp tower for storage and later use.

(7) oxygen delignification of the pulp: first concentrating the pulp with parenchyma cells and fine fibers removed, followed by an oxygen delignification process to obtain a pulp after the oxygen delignification.

(8) ECF bleaching of the pulp: performing ECF bleaching treatment of a DOEpD1P process on the pulp after the oxygen delignification to obtain bleached pulp, and sending the bleached pulp to a pulp board machine to obtain a bamboo fluff pulp board.

(9) ultrafiltration of the treatment liquid: treating the replaced treatment liquid obtained in the step (2) by ultrafiltration, obtaining a retentate and a permeate liquid, wherein the retentate is for separating hemicellulose, and continuing to use the permeate liquid for the alkali treatment in the step (1) after the permeate liquid is supplemented with sodium hydroxide.

(10) recycling of the tail rejects: using the tail rejects obtained in the step (5) to prepare a tail reject pulp, concentrating and dehydrating the pulp containing parenchyma cells and fine fibers (the length is less than 1.5 mm) in the step (6) for recycling to obtain a parenchyma cell pulp, and mixing the tail reject pulp with the parenchyma cell pulp to prepare packaging paper.

Furthermore, the present invention uses *Neosinocalamus affinis* as the raw material, but is not limited to *Neosinocalamus affinis*. All bamboo raw materials with similar fiber morphology to the *Neosinocalamus affinis* raw material (such as *Bambusa intermedia, Dendrocalamus membranaceus, Lingnania chungii*, etc.) are suitable for the present invention.

Furthermore, in the step (1), the bamboos are one or more of *Neosinocalamus affinis, Bambusa intermedia, Dendrocalamus membranaceus*, and *Lingnania chungii*.

Furthermore, in the step (1), the hemicellulose with small relative molecular mass in bamboos will be dissolved in a concentrated alkali solution, and some phenolic lignin with small molecules and silica will also be dissolved in the alkali solution.

Furthermore, in the step (1), a temperature of the treatment in the cooking digester is 60-90° C., a concentration of the alkali liquor is 60-100 g/L, an alkali in the alkali liquor is sodium hydroxide, a ratio of mass (absolute dry weight) of the bamboos to a volume of the alkali liquor is 1:(3-5) kg/L, and time of the treatment is 60-120 minutes.

Furthermore, in the step (2), the weak black liquor refers to black liquor extracted from a pulp during washing; and the replacing refers to pumping the weak black liquor into the replacement cooking digester to replace the treatment liquid in the step (1).

A temperature of the alkali treatment in the method of the present invention is 60-90° C. A high temperature is conducive to dissolve out hemicellulose, while a low temperature results in a slower dissolving-out of hemicellulose. However, if the temperature is too high, it can lead to dissolving-out of a large amount of lignin. At the same time, cellulose will also undergo severe degradation under strong alkaline conditions, so the temperature is milder compared with that of alkaline cooking. A concentration of the alkali liquor should be maintained at 60-100 g/L. If the concentration is too low, the dissolving-out of hemicellulose will be limited. If the concentration of the alkali liquor exceeds 100 g/L, the permeability and swelling ability of the alkali liquor will decrease, and the dissolution ability of hemicellulose will also decrease. Chemicals used in the alkali treatment process are the same as one of subsequent cooking chemicals and will not have any adverse effects on the subsequent cooking.

Furthermore, the replacement described in the step (2) can be performed in an existing replacement cooking digester, and the replacement process can be controlled by temperatures and alkali concentrations.

Furthermore, in the step (3), the warm black liquor refers to black liquor with a temperature greater than 100° C. but less than 140° C. obtained by replacing a cooked pulp with the weak black liquor; the hot black liquor refers to black liquor with a temperature of 140-165° C. obtained during the replacement and cooking.

Furthermore, in the step (3), the cooking method is the kraft process, the white liquor refers to cooking chemicals, mainly comprising sodium hydroxide and sodium sulfide, wherein a ratio of an effective alkali dosage of the white liquor to mass of the initial oven dry bamboos is 10.5%-20%, a sulfidity of the white liquor by NaOH is 25%-30%, a temperature of the cooking is 155-160° C., and time of the cooking is 90-120 minutes; and the temperature decrease refers to the temperature dropping below 100° C.

Furthermore, the washing described in the step (4) refers to use of a vacuum pulp washer to extract the black liquor from the cooked pulp, which can be washed in a counter-current manner. The washed black liquor is called weak black liquor, and the washed pulp is sent to a pulp storage tower for storage.

Furthermore, in the step (5), the screening refers to separating an undigested material in the pulp by utilizing a difference in size between a fiber bundle and a single fiber. The single fiber can pass through a screen slot of screening equipment, and the fiber bundle, due to its larger size, is intercepted and discharged in the form of a screened reject. The separation is performed through a pressure screen, which generally uses a slotted screen with a width of a screen slot controlled between 0.2-0.3 mm and a mass percent concentration of the screened pulp controlled between 0.5%-1%. Using two-stage screening, an accepted pulp enters a next process through the screen slot, and the screened rejects are intercepted. In order to reduce fiber loss, first-stage screened rejects are sent to second-stage screening for secondary screening, the accepted pulp from the second-stage screening enters an inlet of a first-stage pulp screen, and the tail rejects are collected for later use.

Furthermore, the screened accepted pulp is further cleaned. Cleaning is achieved through the principle of centrifugation for separation. Impurities with higher specific gravity receive greater centrifugal force, which separates them from fibers. A hydrocyclone can be used for separation. To ensure cleanliness of the pulp, a one-grade, three-stage residue removal process can be adopted.

Furthermore, the microporous screen described in the step (6) refers to a screen with a pore size of 0.1-0.5 mm, and a mass percent concentration of the screened pulp is 0.1-0.5%. It is easy for parenchyma cells and fine fibers to pass through micropores due to their small sizes, while longer fibers are more difficult to pass through the micropores, thus achieving separation of long fibers from parenchyma cells and fine fibers. The pulp containing parenchyma cells and fine fibers is sent to the parenchyma cell pulp tower for storage and later use.

Furthermore, in the step (7), the concentrating refers to dehydrating the pulp having a relatively low concentration with parenchyma cells and fine fibers removed in the long fiber pulp tower, and increasing a mass percent concentration to 9%-11%, which can be achieved by combining a decker machine and a vacuum pulp washer. The oxygen delignification refers to use of alkali to remove lignin from the pulp under a certain oxygen pressure and temperature. Through the oxygen delignification, the amount of chemicals used for subsequent bleaching can be reduced, reducing production costs. In addition, the wastewater from the oxygen delignification can be sent to the alkali recovery section to reduce discharge of waste liquids and reduce the cost of subsequent wastewater treatment, thus protecting the environment. The oxygen delignification can be achieved through a two-stage oxygen delignification process, where chemicals are added in a first stage, and a process of first-stage oxygen delignification is as follows: a mass percent concentration of the pulp is 9%-11%, a temperature is 80-100° C., time is 20-30 minutes, oxygen pressure is 0.6-0.8 MPa, a ratio of a dosage of sodium hydroxide to mass of an oven dry pulp is 2%-3%, and a ratio of a dosage of magnesium sulfate to mass of an oven dry pulp is 0.2%-0.4%; and a process of second-stage oxygen delignification is as follows: a mass percent concentration of the pulp is 9%-11%, a temperature is 80-100° C., time is 60-90 minutes, and oxygen pressure is 0.4-0.5 MPa.

Furthermore, in the step (8), the ECF bleaching of $D_0EpD_1P$ refers to elemental chlorine-free bleaching, $D_0$ refers to first-stage chlorine dioxide bleaching, Ep refers to hydrogen peroxide-enhanced alkaline extraction, $D_1$ refers to second-stage chlorine dioxide bleaching, and P refers to hydrogen peroxide bleaching. Through the ECF bleaching of $D_0EpD_1P$, lignin in the pulp is completely removed, increasing hydrophilicity of the pulp. A mass percent concentration of the pulp treated in each stage is 9%-11%, and after each stage of treatment, the pulp needs to be washed using a vacuum pulp washer. The bleached pulp after the ECF bleaching is sent to the pulp board machine to produce the bamboo fluff pulp board.

Furthermore, the $D_0$ bleaching process is as follows: a ratio of a dosage of chlorine dioxide to mass of an oven dry pulp is controlled at 0.7%-0.8%, a bleaching temperature is controlled at 60-70° C., bleaching time is controlled at 60-90 minutes, and a system pH is controlled at 2-3.

Furthermore, the Ep alkaline extraction process is as follows: a ratio of a dosage of hydrogen peroxide to mass of an oven dry pulp is controlled at 0.2%-0.4%, a ratio of a dosage of sodium hydroxide to mass of an oven dry pulp is controlled at 0.6%-1%, a treatment temperature is controlled at 70-90° C., treatment time is controlled at 60-90 minutes, and a system pH is controlled at 10.5-12.

Furthermore, the $D_1$ bleaching process is as follows: a ratio of a dosage of chlorine dioxide to mass of an oven dry pulp is controlled at 0.35%-0.4%, a bleaching temperature is controlled at 70-80° C., bleaching time is controlled at 120-150 minutes, and a system pH is controlled at 4-5.

Furthermore, the P bleaching process is as follows: a ratio of a dosage of hydrogen peroxide to mass of an oven dry pulp is controlled at 0.7%-1.0%, a ratio of a dosage of sodium hydroxide to mass of an oven dry pulp is controlled at 0.1%-0.3%, a bleaching temperature is controlled at 70-90° C., bleaching time is controlled at 60-90 minutes, and a system pH is controlled at 10.5-12.

Furthermore, in the step (9), the ultrafiltration refers to separation of an alkali solution containing hemicellulose using an ultrafiltration membrane with a relative molecular mass cutoff of 1000-5000 D. Alkalis with lower relative molecular mass and organic compounds with smaller molecules can pass through ultrafiltration membranes, while hemicellulose with higher relative molecular mass can be intercepted. When a concentration of an intercepted hemicellulose solution reaches 60 grams/liter or more, it can be recycled. This hemicellulose contains abundant polysaccharides, which can be used to prepare furfural or modified to prepare papermaking additives. After supplementing the alkali liquor through the ultrafiltration membrane with sodium hydroxide, the alkali liquor can continue to be added to the step (1).

Furthermore, the alkali liquor through the ultrafiltration membrane is supplemented with sodium hydroxide so as to have a concentration of 60-100 g/L before continuing to be used for the alkali treatment in the step (1).

Furthermore, in the step (10), the preparation of the tail reject pulp refers to grinding the tail rejects in the step (5) into pulp (tail reject pulp) using a high concentration refiner, with a mass percent concentration of 20%-30%, and then using it together with the pulp containing parenchyma cells and fine fibers recycled in the step (6) to prepare packaging paper, fully utilizing resources.

The principle of the present invention is to use high concentration alkali liquor to extract hemicellulose from bamboos under mild conditions, then use the kraft process to cook and prepare bamboo pulp, and then use a screening method to remove coarse rejects and fine fibers to obtain longer bamboo fibers, then using oxygen delignification and ECF bleaching to completely remove lignin from the pulp, and finally obtaining bamboo fluff pulp with a longer fiber length, a lower fine fiber content, lower extractive, ash and lignin contents, higher bulk, and a higher water absorption performance.

The present invention also provides fluff pulp prepared by the method for preparing fluff pulp from bamboos.

Beneficial Effects of the Invention

Beneficial Effects

Advantages of the Present Invention

1. Fully utilizing bamboo resources in China to replace traditional softwood fibers in the preparation of fluff pulp can protect the environment, forests, increase the added value of bamboo pulp, enhance economic benefits, and improve the current situation of China's heavy reliance on imports for fluff pulp.
2. The bamboo fluff pulp prepared by the present invention has a longer fiber length, a lower fine fiber content, lower extractive, ash and lignin contents, higher bulk, and a higher water absorption performance.
3. The present invention can extract bamboo hemicellulose, which mainly includes polyxylose and can be used as industrial raw materials for other chemicals, such as preparing furfural or papermaking additives, to help enterprises achieve their dual carbon goals.
4. The present invention can reduce the viscosity and ash content of black liquor after cooking, improve the evaporation efficiency of an alkali recovery system, reduce evaporator fouling, and improve the thermal efficiency of an alkali recovery combustion furnace.
5. The present invention can increase the efficiency of cooking delignification, significantly improve the efficiency of oxygen delignification, reduce the consumption of ECF bleaching chemicals, and improve the whiteness of bleached pulp.
6. The present invention recycles coarse rejects and fine fibers during the process to prepare packaging pulp, further improving resource utilization and enhancing economic benefits.

DESCRIPTION OF THE EMBODIMENTS

The following will provide a further detailed description of the present invention in conjunction with embodiments, but the implementations of the present invention are not limited to this.

The weak black liquor refers to black liquor extracted from a pulp during washing. If there is no weak black liquor at the beginning of startup, clean water can be used instead of the weak black liquor. At the beginning of startup, clean water can be used instead of the weak black liquor to replace the treatment liquid in the step (1), and then the white liquor is added for direct cooking.

Embodiment 1

A method for preparing fluff pulp from bamboos, including the following steps.

(1) alkali treatment of *Neosinocalamus affinis* chips: treating 100 kg of oven dry *Neosinocalamus affinis* chips with a 60 g/L sodium hydroxide solution in a 60° C. cooking digester, with 5 L of the 60 g/L sodium hydroxide solution used for each kilogram of the oven dry *Neosinocalamus affinis* chips, and treatment time of 2 hours to obtain a treatment liquid.
(2) separation of the treatment liquid: first replacing the treatment liquid in the step (1) with a weak black liquor, and storing a replaced treatment liquid separately in a container for later use.
(3) cooking of treated *Neosinocalamus affinis* chips: replacing the weak black liquor with 120° C. warm black liquor, where the weak black liquor entered an original weak black liquor tank, then replacing the warm black liquor with 150° C. hot black liquor, where the warm black liquor entered a warm black liquor tank, after the replacement was completed, adding white liquor for cooking, after the cooking was completed, replacing the hot black liquor with the weak black liquor, where the hot black liquor entered a hot black liquor tank, and the warm black liquor entered the warm black liquor tank, and when a temperature of a pulp decreased to 90° C., using a pump to pump the pulp to a pulp storage tower. An effective alkali dosage of the white liquor was 14.0% (by NaOH, relative to the initial oven dry bamboo chips), sulfidity of the white liquor was 25%, a cooking temperature was 155° C., cooking time was 120 minutes, a fine pulp yield was 45.32%, after cooking, mass percent concentrations of inorganic and organic compounds in the black liquor were 29.86% and 70.14%, respectively, a solid content of the black liquor was 180.2 g/L, viscosity of the black liquor was 3.80 mPa·s, a calorific value of the black liquor was 12.68 MJ/kg, a pulp kappa number was 14.87, pulp whiteness was 30.36%, a fiber length was 1.68 mm, and a content of fine fibers was 10.42% (area ratio).
(4) washing of the pulp: using four vacuum pulp washers to wash the pulp in series, where the pulp was sequentially washed from a first pulp washer to a second pulp washer, then passed through a third pulp washer, and finally discharged from a fourth pulp washer, the direction of a washing solution was opposite to that of the pulp, the fourth pulp washer used 80° C. hot water as the washing solution, and a filtrate produced by each pulp washer was used as the washing solution of a previous pulp washer for washing, a filtrate from the first pulp washer was sent to the weak black liquor tank for storage; and mass percent concentrations of incoming pulp and outgoing pulp for each washing machine were 1.5% and 10%, respectively, with a dilution factor of 2 cubic meters of a washing solution per ton of air dried pulp, and washed pulp was sent to a washed pulp tower.
(5) screening and cleaning of the pulp: screening the washed pulp using a pressure screen, which uses a slotted screen with a screen slot width of 0.2 mm and a mass percent concentration of a screened pulp of 0.5%, sending the screened pulp to a screened pulp tower for storage, and re-screening screened rejects through the slotted screen with a screen slot width of 0.3 mm and a mass percent concentration of a screened pulp of 1%, reusing an accepted pulp, and collecting tail rejects for later use. The cleaning adopted a hydrocyclone with a cleaning mass percent concentration of 0.5%. The process adopted first-grade, three-stage treatment, where an accepted pulp from a first-stage cleaner entered a next process and reject pulp entered a second-stage cleaner; an accepted pulp from a second-stage cleaner entered a feed tank of the first-stage cleaner, and reject pulp entered a third-stage cleaner; and an accepted pulp from a third-stage cleaner entered a feed tank of the second-stage cleaner, and reject pulp was discharged.

(6) screening of parenchyma cells: removing parenchyma cells from a screened and cleaned pulp using a microporous screen with a pore size of 0.1 mm and a mass percent concentration of a screened pulp of 0.1%, where pulp with parenchyma cells removed had a Kappa number of 13.02, pulp brightness of 32.16%, a fiber length of 2.18 mm, and a fine fiber content of 2.16% (area ratio). A pulp with parenchyma cells removed was sent to a long fiber pulp tower for storage, and a pulp containing parenchyma cells and fine fibers was sent to a parenchyma cell pulp tower for storage and later use.

(7) oxygen delignification of the pulp: first increasing a mass percent concentration of the pulp with parenchyma cells and fine fibers removed to 2% with a decker machine, then concentrating with a vacuum pulp washer to a mass percent concentration of 9%, then using a two-stage oxygen delignification process to remove lignin from the pulp, where the oxygen delignification process was as follows: a first-stage oxygen delignification process was as follows: a mass percent concentration of the pulp was 9%, oxygen pressure was controlled at 0.8 MPa, and a temperature was controlled at 100° C., time was controlled at 20 minutes, a ratio of a sodium hydroxide dosage to mass of an oven dry pulp was controlled at 3.0%, and a ratio of a magnesium sulfate dosage to mass of an oven dry pulp was controlled at 0.4%; after the first-stage oxygen delignification was completed, it directly entered second-stage oxygen delignification, and a second-stage oxygen delignification process was as follows: a mass percent concentration of the pulp was 9%, oxygen pressure was controlled at 0.5 MPa, a temperature was controlled at 100° C., and time was controlled at 60 minutes. After the oxygen delignification was completed, a vacuum pulp washer was used to clean the pulp. The quality of the pulp was as follows: kappa number 6.98, brightness 50.30%, fiber length 2.14 mm, and fine fiber content 2.42% (area ratio).

(8) ECF bleaching of the pulp: performing ECF bleaching treatment of a $D_0EpD_1P$ process on the pulp after the oxygen delignification to completely remove lignin from the pulp and increase hydrophilicity of the pulp. The Do bleaching process was as follows: a ratio of a chlorine dioxide dosage to mass of an oven dry pulp was controlled at 0.74%, a bleaching temperature was controlled at 60° C., bleaching time was controlled at 90 minutes, and a system pH was 3.0; the Ep alkali treatment process was as follows: a ratio of a sodium hydroxide dosage to mass of an oven dry pulp was controlled at 0.80%, a ratio of a hydrogen peroxide dosage to mass of an oven dry pulp was controlled at 0.3%, a temperature was controlled at 70° C., treatment time was controlled at 90 minutes, and a system pH was 11.5; the $D_1$ bleaching process was as follows: a ratio of a chlorine dioxide dosage to mass of an oven dry pulp was controlled at 0.37%, a bleaching temperature was controlled at 70° C., bleaching time was controlled at 150 minutes, and a system pH was 5.0; and the P bleaching process was as follows: a ratio of a hydrogen peroxide dosage to mass of an oven dry pulp was controlled at 0.80%, a ratio of a sodium hydroxide dosage to mass of an oven dry pulp was controlled at 0.2%, a bleaching temperature was controlled at 70° C., bleaching time was controlled at 90 minutes, and a system pH was 11.2, and a mass percent concentration of the pulp treated in each stage is 9%, and after each stage of treatment, the pulp needs to be washed using a vacuum pulp washer. The quality of the bleached pulp after ECF bleaching was as follows: kappa number <1, brightness 89.87%, fiber length 1.94 mm, and fine fiber content 3.24% (area ratio). Finally, the bleached pulp was transported to the pulp board machine to produce the bamboo fluff pulp board. Its quality indicators were as follows: basis weight 750 g·m$^{-2}$, thickness 1.92 mm, moisture mass percent content 8%, density 390.2 kg/m$^3$, burst resistance 902.00 kPa, brightness 89.87% ISO, DCM extractive mass percent content 0.02%, ash mass percent content 0.20%, fiber length 1.94 mm, fiber coarseness 13.6 mg/100 m, and fibers per gram of pulp 4.58 million.

(9) ultrafiltration of the treatment liquid: performing the ultrafiltration treatment on the treatment liquid replaced with the weak black liquor in the step (2) with an ultrafiltration membrane with a relative molecular weight cutoff of 1000 D, where an organic compound content was 24.8 g/L, of which a hemicellulose content was 21 g/L, an alkali liquor concentration (a solute calculated for the alkali liquor concentration was sodium hydroxide) decreased to 45 g/L, and when an organic compound content of a retentate reached 60 g/L, the ultrafiltration treatment was stopped, where an organic compound content of a permeate liquid was 2.48 g/L, and an alkali liquor concentration was 45 g/L. The permeate liquid was supplemented with sodium hydroxide to achieve a concentration of 60 g/L before sending to the step (1) for recycling. The retentate was used for recycling of hemicellulose and alkalis.

(10) recycling of the tail rejects: treating the tail rejects in the step (5) with a high concentration refiner, with a pulp mass percent concentration of 20%, undergoing two-stage refining, with a first-stage pulp gap of 0.3 mm and a second-stage pulp gap of 0.15 mm to obtain tail reject pulp, directly concentrating the pulp containing parenchyma cells and fine fibers in the step (6), using a multi-disk thickener for concentrating and dehydration, with mass percent concentrations of incoming pulp and outgoing pulp were 0.25% and 8%, respectively, mixing with the tail reject pulp, then using a twin net squeezer to squeeze and dehydrate the pulp, with a pulp mass percent concentration reaching 30% or more, and selling directly as packaging pulp.

Embodiment 2

A method for preparing fluff pulp from bamboos, including the following steps.

(1) alkali treatment of *Neosinocalamus affinis* chips: treating 100 kg of oven dry *Neosinocalamus affinis* chips with an 80 g/L sodium hydroxide solution in a 90° C. cooking digester, with 3 L of the 80 g/L sodium hydroxide solution used for each kilogram of the oven dry *Neosinocalamus affinis* chips, and treatment time of 1.5 hours to obtain a treatment liquid.

(2) separation of the treatment liquid: first replacing the treatment liquid in the step (1) with a weak black liquor, and storing a replaced treatment liquid separately in a container for later use.

(3) cooking of treated *Neosinocalamus affinis* chips: replacing the weak black liquor with 120° C. warm black liquor, where the weak black liquor entered an original weak black liquor tank, then replacing the warm black liquor with 150° C. hot black liquor, where the warm black liquor entered a warm black liquor tank, after the replacement was completed, adding white liquor for cooking, after the cooking was completed, replacing the hot black liquor with the weak black liquor, where the hot black liquor entered a hot black liquor tank, and the warm black liquor entered the warm black liquor tank, and when a temperature of a pulp decreased to 90° C., using a pump to pump the pulp to a pulp storage tower. An effective alkali dosage of the white liquor was 12.5% (by NaOH, relative to the initial oven dry bamboo chips), sulfidity of the white liquor was 30%, a cooking temperature was 160° C., cooking time was 90 minutes, a fine pulp yield was 44.50%, after cooking, mass percent concentrations of inorganic and organic compounds in the black liquor were 28.64% and 71.36%, respectively, a solid content of the black liquor was 176.3 g/L, viscosity of the black liquor was 3.75 mPa·s, a calorific value of the black liquor was 12.98 MJ/kg, a pulp kappa number was 14.72, pulp brightness was 30.48%, a fiber length was 1.70 mm, and a content of fine fibers was 10.38% (area ratio).

(4) washing of the pulp: using four vacuum pulp washers to wash the pulp in series, where the pulp was sequentially washed from a first pulp washer to a second pulp washer, then passed through a third pulp washer, and finally discharged from a fourth pulp washer, the direction of a washing solution was opposite to that of the pulp, the fourth pulp washer used 80° C. hot water as the washing solution, and a filtrate produced by each pulp washer was used as the washing solution of a previous pulp washer for washing, a filtrate from the first pulp washer was sent to the weak black liquor tank for storage; and mass percent concentrations of incoming pulp and outgoing pulp for each washing machine were 1.5% and 10%, respectively, with a dilution factor of 2 cubic meters of a washing solution per ton of air dried pulp, and washed pulp was sent to a washed pulp tower.

(5) screening and cleaning of the pulp: screening the washed pulp using a pressure screen, which uses a slotted screen with a screen slot width of 0.2 mm and a mass percent concentration of a screened pulp of 0.5%, sending the screened pulp to a screened pulp tower for storage, and re-screening screened rejects through the slotted screen with a screen slot width of 0.3 mm and a mass percent concentration of a screened pulp of 1.0%, reusing an accepted pulp, and collecting tail rejects for later use. The cleaning adopted a hydrocyclone with a cleaning mass percent concentration of 0.5%. The process adopted first-grade, three-stage treatment, where an accepted pulp from a first-stage cleaner entered a next process and reject pulp entered a second-stage cleaner; an accepted pulp from a second-stage cleaner entered a feed tank of the first-stage cleaner, and reject pulp entered a third-stage cleaner; and an accepted pulp from a third-stage cleaner entered a feed tank of the second-stage cleaner, and reject pulp was discharged.

(6) screening of parenchyma cells: removing parenchyma cells from a screened and cleaned pulp using a microporous screen with a pore size of 0.3 mm and a mass percent concentration of a screened pulp of 0.3%, where pulp with parenchyma cells removed had a Kappa number of 12.88, pulp brightness of 32.40%, a fiber length of 2.26 mm, and a fine fiber content of 1.30% (area ratio). A pulp with parenchyma cells removed was sent to a long fiber pulp tower for storage, and a pulp containing parenchyma cells and fine fibers was sent to a parenchyma cell pulp tower for storage and later use.

(7) oxygen delignification of the pulp: first increasing a mass percent concentration of the pulp with parenchyma cells and fine fibers removed to 2% with a decker machine, then concentrating with a vacuum pulp washer to a mass percent concentration of 11%, then using a two-stage oxygen delignification process to remove lignin from the pulp, where the oxygen delignification process was as follows: a first-stage oxygen delignification process was as follows: a mass percent concentration of the pulp was 11%, oxygen pressure was controlled at 0.60 MPa, and a temperature was controlled at 80° C., time was controlled at 30 minutes, a ratio of a sodium hydroxide dosage to mass of an oven dry pulp was controlled at 2.0%, and a ratio of a magnesium sulfate dosage to mass of an oven dry pulp was controlled at 0.2%; after the first-stage oxygen delignification was completed, it directly entered second-stage oxygen delignification, and a second-stage oxygen delignification process was as follows: a mass percent concentration of the pulp was 11%, oxygen pressure was controlled at 0.40 MPa, a temperature was controlled at 80° C., and time was controlled at 90 minutes. After the oxygen delignification was completed, a vacuum pulp washer was used to clean the pulp. The quality of the pulp is as follows: kappa number 6.68, brightness 50.70%, fiber length 2.21 mm, and fine fiber content 1.95% (area ratio).

(8) ECF bleaching of the pulp: performing ECF bleaching treatment of a $D_0EpD_1P$ process on the pulp after the oxygen delignification to completely remove lignin from the pulp and increase hydrophilicity of the pulp. The Do bleaching process was as follows: a ratio of a chlorine dioxide dosage to mass of an oven dry pulp was controlled at 0.71%, a bleaching temperature was controlled at 70° C., bleaching time was controlled at 60 minutes, and a system pH was 2.5; the Ep alkali treatment process was as follows: a ratio of a sodium hydroxide dosage to mass of an oven dry pulp was controlled at 0.70%, a ratio of a hydrogen peroxide dosage to mass of an oven dry pulp was controlled at 0.20%, a temperature was controlled at 80° C., treatment time was controlled at 60 minutes, and a system pH was 11.0; the $D_1$ bleaching process was as follows: a ratio of a chlorine dioxide dosage to mass of an oven dry pulp was controlled at 0.36%, a bleaching temperature was controlled at 75° C., bleaching time was controlled at 120 minutes, and a system pH was 4.0; and the P bleaching process was as follows: a ratio of a hydrogen peroxide dosage to mass of an oven dry pulp was controlled at 0.70%, a ratio of a sodium hydroxide dosage to mass of an oven dry pulp was controlled at 0.12%, a bleaching temperature was controlled at 80° C., bleaching time was controlled at 75 minutes, and a system pH was 11.5, and a mass percent concentration of the pulp treated in each stage is 11%, and after each stage of treatment, the pulp needs to be washed using a vacuum pulp washer. The quality of the bleached pulp after ECF bleaching was as follows:

kappa number <1, whiteness 90.14%, fiber length 2.02 mm, and fine fiber content 2.90% (area ratio). Finally, the bleached pulp was transported to the pulp board machine to produce the bamboo fluff pulp board. Its quality indicators were as follows: basis weight 750 g·m$^{-2}$, thickness 1.93 mm, moisture mass percent content 8%, density 388.2 kg/m3, burst resistance 760.00 kPa, brightness 90.14% ISO, DCM extractive mass percent content 0.015%, ash mass percent content 0.16%, fiber length 2.02 mm, fiber coarseness 13.7 mg/100 m, and fibers per gram of pulp 4.30 million.

(9) ultrafiltration of the treatment liquid: performing the ultrafiltration treatment on the treatment liquid replaced with the weak black liquor in the step (2) with an ultrafiltration membrane with a relative molecular weight cutoff of 3000 D, where an organic compound content was 35.6 g/L, of which a hemicellulose content was 25.1 g/L, an alkali liquor concentration (a solute calculated for the alkali liquor concentration was sodium hydroxide) decreased to 61 g/L, and when an organic compound content of a retentate reached 60 g/L, the ultrafiltration treatment was stopped, where an organic compound content of a permeate liquid was 3.58 g/L, and an alkali liquor concentration was 61 g/L. The permeate liquid was supplemented with sodium hydroxide to achieve a concentration of 80 g/L before sending to the step (1) for recycling. The retentate was used for recycling of hemicellulose and alkalis.

(10) recycling of the tail rejects: treating the tail rejects in the step (5) with a high concentration refiner, with a pulp mass percent concentration of 30%, undergoing two-stage refining, with a first-stage pulp gap of 0.3 mm and a second-stage pulp gap of 0.15 mm to obtain tail reject pulp, directly concentrating the pulp containing parenchyma cells and fine fibers in the step (6), using a multi-disk thickener for concentrating and dehydration, with mass percent concentrations of incoming pulp and outgoing pulp were 0.25% and 8%, respectively, mixing with the tail reject pulp, then using a twin net squeezer to squeeze and dehydrate the pulp, with a pulp mass percent concentration reaching 30% or more, and selling directly as packaging pulp.

Embodiment 3

A method for preparing fluff pulp from bamboos, including the following steps.

((1) alkali treatment of *Neosinocalamus affinis* chips: treating 100 kg of oven dry *Neosinocalamus affinis* chips with a 100 g/L sodium hydroxide solution in an 80° C. cooking digester, with 4 L of the 100 g/L sodium hydroxide solution used for each kilogram of the oven dry *Neosinocalamus affinis* chips, and treatment time of 1 hour to obtain a treatment liquid.

((2) separation of the treatment liquid: first replacing the treatment liquid in the step (1) with a weak black liquor, and storing a replaced treatment liquid separately in a container for later use.

((3) cooking of treated *Neosinocalamus affinis* chips: replacing the weak black liquor with 120° C. warm black liquor, where the weak black liquor entered an original weak black liquor tank, then replacing the warm black liquor with 150° C. hot black liquor, where the warm black liquor entered a warm black liquor tank, after the replacement was completed, adding white liquor for cooking, after the cooking was completed, replacing the hot black liquor with the weak black liquor, where the hot black liquor entered a hot black liquor tank, and the warm black liquor entered the warm black liquor tank, and when a temperature of a pulp decreased to 90° C., using a pump to pump the pulp to a pulp storage tower. An effective alkali dosage of the white liquor was 10.5% (by NaOH, relative to the initial oven dry bamboo chips), sulfidity of the white liquor was 30%, a cooking temperature was 160° C., cooking time was 90 minutes, a fine pulp yield was 43.94%, after cooking, a mass percent concentrations of inorganic and organic compounds in the black liquor were 27.77% and 72.23%, respectively, a solid content of the black liquor was 171.2 g/L, viscosity of the black liquor was 3.70 mPa-s, a calorific value of the black liquor was 13.26 MJ/kg, a pulp kappa number was 14.65, pulp brightness was 30.67%, a fiber length was 1.71 mm, and a content of fine fibers was 10.02% (area ratio).

((4) washing of the pulp: using four vacuum pulp washers to wash the pulp in series, where the pulp was sequentially washed from a first pulp washer to a second pulp washer, then passed through a third pulp washer, and finally discharged from a fourth pulp washer, the direction of a washing solution was opposite to that of the pulp, the fourth pulp washer used 80° C. hot water as the washing solution, and a filtrate produced by each pulp washer was used as the washing solution of a previous pulp washer for washing, a filtrate from the first pulp washer was sent to the weak black liquor tank for storage; and mass percent concentrations of incoming pulp and outgoing pulp for each washing machine were 1.5% and 10%, respectively, with a dilution factor of 2 cubic meters of a washing solution per ton of air dried pulp, and washed pulp was sent to a washed pulp tower.

((5) screening and cleaning of the pulp: screening the washed pulp using a pressure screen, which uses a slotted screen with a screen slot width of 0.2 mm and a mass percent concentration of a screened pulp of 0.5%, sending the screened pulp to a screened pulp tower for storage, and re-screening screened rejects through the slotted screen with a screen slot width of 0.3 mm and a mass percent concentration of a screened pulp of 1.0%, reusing an accepted pulp, and collecting tail rejects for later use. The cleaning adopted a hydrocyclone with a cleaning mass percent concentration of 0.5%. The process adopted first-grade, three-stage treatment, where an accepted pulp from a first-stage cleaner entered a next process and reject pulp entered a second-stage cleaner; an accepted pulp from a second-stage cleaner entered a feed tank of the first-stage cleaner, and reject pulp entered a third-stage cleaner; and an accepted pulp from a third-stage cleaner entered a feed tank of the second-stage cleaner, and reject pulp was discharged.

((6) screening of parenchyma cells: removing parenchyma cells from a screened and cleaned pulp using a microporous screen with a pore size of 0.5 mm and a mass percent concentration of a screened pulp of 0.5%, where pulp with parenchyma cells removed had a Kappa number of 12.81, pulp whiteness of 32.44%, a fiber length of 2.29 mm, and a fine fiber content of 1.22% (area ratio). A pulp with parenchyma cells removed was sent to a long fiber pulp tower for storage, and a pulp containing parenchyma cells and fine fibers was sent to a parenchyma cell pulp tower for storage and later use.

((7) oxygen delignification of the pulp: first increasing a mass percent concentration of the pulp with parenchyma cells and fine fibers removed to 2% with a decker machine, then concentrating with a vacuum pulp washer to a mass percent concentration of 10%, then using a two-stage oxygen delignification process to remove lignin from the pulp, where the oxygen delignification process was as follows: a first-stage oxygen delignification process was as follows: a mass percent concentration of the pulp was 10%, oxygen pressure was controlled at 0.76 MPa, and a temperature was controlled at 95° C., time was controlled at 20 minutes, a ratio of a sodium hydroxide dosage to mass of an oven dry pulp was controlled at 2.2%, and a ratio of a magnesium sulfate dosage to mass of an oven dry pulp was controlled at 0.3%; after the first-stage oxygen delignification was completed, it directly entered second-stage oxygen delignification, and a second-stage oxygen delignification process was as follows: a mass percent concentration of the pulp was 10%, oxygen pressure was controlled at 0.42 MPa, a temperature was controlled at 100° C., and time was controlled at 60 minutes. After the oxygen delignification was completed, a vacuum pulp washer was used to clean the pulp. The quality of the pulp is as follows: kappa number 6.55, brightness 50.90%, fiber length 2.23 mm, and fine fiber content 1.90% (area ratio).

((8) ECF bleaching of the pulp: performing ECF bleaching treatment of a $D_0EpD_1P$ process on the pulp after the oxygen delignification to completely remove lignin from the pulp and increase hydrophilicity of the pulp. The Do bleaching process was as follows: a ratio of a chlorine dioxide dosage to mass of an oven dry pulp was controlled at 0.7%, a bleaching temperature was controlled at 60° C., bleaching time was controlled at 65 minutes, and a system pH was 2.5; the Ep alkali treatment process was as follows: a ratio of a sodium hydroxide dosage to mass of an oven dry pulp was controlled at 0.60%, a ratio of a hydrogen peroxide dosage to mass of an oven dry pulp was controlled at 0.3%, a temperature was controlled at 70° C., treatment time was controlled at 60 minutes, and a system pH was 10.5; the $D_1$ bleaching process was as follows: a ratio of a chlorine dioxide dosage to mass of an oven dry pulp was controlled at 0.35%, a bleaching temperature was controlled at 75° C., bleaching time was controlled at 150 minutes, and a system pH was 4.5; and the P bleaching process was as follows: a ratio of a hydrogen peroxide dosage to mass of an oven dry pulp was controlled at 0.75%, a ratio of a sodium hydroxide dosage to mass of an oven dry pulp was controlled at 0.1%, a bleaching temperature was controlled at 72° C., bleaching time was controlled at 60 minutes, and a system pH was 10.5, and a mass percent concentration of the pulp treated in each stage is 10%, and after each stage of treatment, the pulp needs to be washed using a vacuum pulp washer. The quality of the bleached pulp after ECF bleaching was as follows: kappa number <1, brightness 90.47%, fiber length 2.03 mm, and fine fiber content 2.88% (area ratio). Finally, the bleached pulp was transported to the pulp board machine to produce the bamboo fluff pulp board. Its quality indicators were as follows: basis weight 750 g·m$^{-2}$, thickness 1.94 mm, moisture mass percent content 8%, density 386.16 kg/m$^3$, burst resistance 752.00 kPa, brightness 90.47% ISO, DCM extractive mass percent content 0.013%, ash mass percent content 0.15%, fiber length 2.03 mm, fiber coarseness 13.7 mg/100 m, and fibers per gram of pulp 4.28 million.

((9) ultrafiltration of the treatment liquid: performing the ultrafiltration treatment on the treatment liquid replaced with the weak black liquor in the step (2) with an ultrafiltration membrane with a relative molecular weight cutoff of 5000 D, where an organic compound content was 36.20 g/L, of which a hemicellulose content was 25.6 g/L, an alkali liquor concentration (a solute calculated for the alkali liquor concentration was sodium hydroxide) decreased to 79 g/L, and when an organic compound content of a retentate reached 60 g/L, the ultrafiltration treatment was stopped, where an organic compound content of a permeate liquid was 4.08 g/L, and an alkali liquor concentration was 79 g/L. The permeate liquid was supplemented with sodium hydroxide to achieve a concentration of 100 g/L before sending to the step (1) for recycling. The retentate was used for recycling of hemicellulose and alkalis.

((10) recycling of the tail rejects: treating the tail rejects in the step (5) with a high concentration refiner, with a pulp mass percent concentration of 25%, undergoing two-stage refining, with a first-stage pulp gap of 0.3 mm and a second-stage pulp gap of 0.15 mm to obtain tail reject pulp, directly concentrating the pulp containing parenchyma cells and fine fibers in the step (6), using a multi-disk thickener for concentrating and dehydration, with mass percent concentrations of incoming pulp and outgoing pulp were 0.25% and 8%, respectively, mixing with the tail reject pulp, then using a twin net squeezer to squeeze and dehydrate the pulp, with a pulp mass percent concentration reaching 30% or more, and selling directly as packaging pulp.

Comparative Embodiment 1

A traditional method for preparing bleached bamboo pulp from bamboos, including the following steps.

((1) cooking of *Neosinocalamus affinis* chips: adding 100 kg of *Neosinocalamus affinis* chips to a cooking digester, and filling each kilogram of oven dry *Neosinocalamus affinis* chips with 4 L of 120° C. warm black liquor, after being filled, replacing the warm black liquor with 150° C. hot black liquor, where the warm black liquor entered a warm black liquor tank, after the replacement was completed, adding white liquor for cooking, after the cooking was completed, replacing the hot black liquor with a weak black liquor, where the hot black liquor entered a hot black liquor tank, and the warm black liquor entered the warm black liquor tank, and when a temperature of a pulp decreased to 90° C., using a pump to pump the pulp to a pulp storage tower. An effective alkali dosage of the white liquor was 20% (by NaOH, relative to the initial oven dry bamboo chips), sulfidity of the white liquor was 25%, a cooking temperature was 160° C., cooking time was 90 minutes, a fine pulp yield was 45.52%, after cooking, ratios of inorganic and organic compounds in the black liquor were 32.27% and 67.73%, respectively, a solid content of the black liquor was 194.45 g/L, viscosity of the black liquor was 4.03 mPa-s, a calorific value of the black liquor was 12.18 MJ/kg, a pulp kappa number was 15.09, pulp brightness was 30.26%, a fiber length was 1.64 mm, and a content of fine fibers was 11.62% (area ratio).

((2) washing of the pulp: using four vacuum pulp washers to wash the pulp in series, where the pulp was sequentially washed from a first pulp washer to a second pulp washer, then passed through a third pulp washer, and finally discharged from a fourth pulp washer, the direction of a washing solution was opposite to that of the pulp, the fourth pulp washer used 80° C. hot water as the washing solution, and a filtrate produced by each pulp washer was used as the washing solution of a previous pulp washer for washing, a filtrate from the first pulp washer was sent to the weak black liquor tank for storage; and mass percent concentrations of incoming pulp and outgoing pulp for each washing machine were 1.5% and 10%, respectively, with a dilution factor of 2 cubic meters of a washing solution per ton of air dried pulp, and washed pulp was sent to a washed pulp tower.

((3) screening and cleaning of the pulp: screening the washed pulp using a pressure screen, which uses a slotted screen with a screen slot width of 0.2 mm and a mass percent concentration of a screened pulp of 0.5%, sending the screened pulp to a screened pulp tower for storage, and re-screening screened rejects through the slotted screen with a screen slot width of 0.3 mm and a mass percent concentration of a screened pulp of 1.0%, reusing an accepted pulp, and collecting tail rejects for later use. The cleaning adopted a hydrocyclone with a cleaning mass percent concentration of 0.5%. The process adopted first-grade, three-stage treatment, where an accepted pulp from a first-stage cleaner entered a next process and reject pulp entered a second-stage cleaner; an accepted pulp from a second-stage cleaner entered a feed tank of the first-stage cleaner, and reject pulp entered a third-stage cleaner; and an accepted pulp from a third-stage cleaner entered a feed tank of the second-stage cleaner, and reject pulp was discharged.

((4) oxygen delignification of the pulp: first increasing a mass percent concentration of a screened and cleaned pulp to 2% with a decker machine, then concentrating with a vacuum pulp washer to a mass percent concentration of 10%, then using a two-stage oxygen delignification process to remove lignin from the pulp, where the oxygen delignification process was as follows: a first-stage oxygen delignification process was as follows: a mass percent concentration of the pulp was 10%, oxygen pressure was controlled at 0.76 MPa, and a temperature was controlled at 95° C., time was controlled at 20 minutes, a ratio of a sodium hydroxide dosage to mass of an oven dry pulp was controlled at 3.0%, and a ratio of a magnesium sulfate dosage to mass of an absolute dry pulp was controlled at 0.3%; after the first-stage oxygen delignification was completed, it directly entered second-stage oxygen delignification, and a second-stage oxygen delignification process was as follows: a mass percent concentration of the pulp was 10%, oxygen pressure was controlled at 0.42 MPa, a temperature was controlled at 100° C., and time was controlled at 60 minutes. After the oxygen delignification was completed, a vacuum pulp washer was used to clean the pulp. The quality of the pulp was as follows: kappa number 8.02, brightness 48.86%, fiber length 1.62 mm, and fine fiber content 11.80% (area ratio).

((5) ECF bleaching of the pulp: performing ECF bleaching treatment of a $D_0EpD_1P$ process on the pulp after the oxygen delignification to remove lignin from the pulp and increase hydrophilicity of the pulp. The Do bleaching process was as follows: a ratio of a chlorine dioxide dosage to mass of an oven dry pulp was controlled at 0.8%, a bleaching temperature was controlled at 70° C., bleaching time was controlled at 60 minutes, and a system pH was 2.0; the Ep alkali treatment process was as follows: a ratio of a sodium hydroxide dosage to mass of an oven dry pulp was controlled at 1.0%, a ratio of a hydrogen peroxide dosage to mass of an oven dry pulp was controlled at 0.4%, a temperature was controlled at 90° C., treatment time was controlled at 60 minutes, and a system pH was 12.0; the $D_1$ bleaching process was as follows: a ratio of a chlorine dioxide dosage to mass of an oven dry pulp was controlled at 0.40%, a bleaching temperature was controlled at 80° C., bleaching time was controlled at 120 minutes, and a system pH was 5.0; and the P bleaching process was as follows: a ratio of a hydrogen peroxide dosage to mass of an oven dry pulp was controlled at 1.0%, a ratio of a sodium hydroxide dosage to mass of an oven dry pulp was controlled at 0.3%, a bleaching temperature was controlled at 70° C., bleaching time was controlled at 60 minutes, and a system pH was 12.0. The quality of bleached pulp after the ECF bleaching was as follows: brightness 88.32%, fiber length 1.60 mm, and fine fiber content 12.04% (area ratio). Finally, the bleached pulp was transported to the pulp board machine to produce the bamboo fluff pulp board. Its quality indicators were as follows: basis weight 750 g·m$^{-2}$, thickness 1.70 mm, moisture mass percent content 8%, density 441.61 kg/m$^3$, burst resistance 1254.00 kPa, brightness 88.32% ISO, DCM extractive mass percent content 0.12%, ash mass percent content 0.25%, fiber length 1.60 mm, fiber coarseness 12.6 mg/100 m, and fibers per gram of pulp 10.47 million.

From the results, it can be seen that compared with Embodiment 3, the proportion of inorganic compounds, solid content, and viscosity of the black liquor in Comparative embodiment 1 were higher than those in Embodiment 3, while the calorific value of the black liquor was lower than that in Embodiment 3. Therefore, in Embodiment 3, the evaporation efficiency of an alkali recovery system can be improved, evaporator fouling is reduced, and the thermal efficiency of an alkali recovery combustion furnace can be improved. Compared with Embodiment 3, for Comparative embodiment 1 at a higher dosage of chemicals (20% effective alkali dosage in white liquor (by NaOH, relative to the initial oven dry bamboo chips), its final brightness was still lower than that of Embodiment 3, and the quality indicators of the final product were significantly worse than those of Embodiment 3, especially the DCM extractive content, ash content, fiber length, burst resistance, and fiber number per gram of pulp.

The quality indicators of a foreign commercial fluff pulp (raw material loblolly pine) were as follows: basis weight 750 g·m$^{-2}$, thickness 1.25 mm, moisture 9%, density 580 kg/m$^3$, burst resistance 950 kPa, brightness 86% ISO, DCM extractive <0.01%, ash content 0.16%, fiber length 2.45 mm, fiber coarseness 21 mg/100 m, and fibers per gram of pulp 4.04 million.

From the results of Embodiments 1-3, it can be seen that the density of the bamboo fluff pulp of the present invention was significantly lower than that of the commercial fluff pulp, and the burst resistance was also lower than that of the commercial fluff pulp. This indicated that power consumption required by the bamboo fluff pulp of the present invention when defibration is low, leading to little damage to fibers, and high dry bulkiness after defibration. The brightness of the bamboo fluff pulp in the present invention was higher than that of the commercial fluff pulp.

Except for slightly lower fiber coarseness, all other indicators were close to those of the commercial pulp. The low fiber coarseness is due to the fact that the diameter of bamboo fibers is only half of that of loblolly pine, and the network structure formed by the fibers has smaller capillaries. In addition, bamboo fibers have thicker cell walls, larger wall thickness to lumen diameter ratios, and longer fiber length to width ratios, giving them greater rigidity. This thin and rigid capillary can quickly absorb liquids, maintain liquids well, have good water absorption performance, and withstand certain pressure.

What is claimed is:

1. A method for preparing fluff pulp from bamboos, comprising the following steps:
   (1) alkali treatment of bamboos: treating a bamboo raw material with an alkali liquor in a cooking digester to obtain a treatment liquid and treated bamboos; wherein a temperature of the alkali treatment in the cooking digester is 60-90° C., a concentration of the alkali liquor is 60-100 g/L, and an alkali in the alkali liquor is sodium hydroxide; a ratio of mass of the bamboos to a volume of the alkali liquor is 1: (3-5) kg/L; and time of the alkali treatment is 60-120 minutes;
   (2) separation of the treatment liquid: replacing the treatment liquid in the step (1) with a weak black liquor, and storing a replaced treatment liquid separately in a container for later use; wherein the weak black liquor refers to black liquor extracted from a pulp during washing; and the replacing refers to pumping the weak black liquor into the cooking digester to replace the treatment liquid in the step (1);
   (3) cooking of the treated bamboos: replacing the weak black liquor with a warm black liquor, wherein the weak black liquor enters an original weak black liquor tank, then replacing the warm black liquor with a hot black liquor, wherein the warm black liquor enters a warm black liquor tank, after the replacement is completed, adding white liquor for cooking, after the cooking is completed, replacing the hot black liquor with the weak black liquor, wherein the hot black liquor enters a hot black liquor tank, and the warm black liquor enters the warm black liquor tank, and when a temperature of a pulp decreases, using a pump to pump the pulp to a pulp storage tower; wherein the warm black liquor refers to black liquor with a temperature greater than 100° C. but less than 140° C. obtained by replacing a cooked pulp with the weak black liquor; the hot black liquor refers to black liquor with a temperature of 140-165° C. obtained during the replacement and cooking; and the white liquor refers to cooking chemicals obtained from pulp production and alkali recovery, mainly comprising sodium hydroxide and sodium sulfide, wherein a ratio of an effective alkali dosage of the white liquor to mass of the bamboo raw material is 10.5%-14%, a sulfidity of the white liquor by NaOH is 25%-30%, a temperature of the cooking is 155-160° C., time of the cooking is 90-120 minutes, and the temperature decrease refers to the temperature dropping below 100° C.;
   (4) washing of the pulp: washing the pulp in the pulp storage tower of the step (3) to obtain a washed pulp and a washed weak black liquor, sending the washed pulp to a washed pulp tower, and sending the washed weak black liquor to the weak black liquor tank;
   (5) screening and cleaning of the pulp: screening the washed pulp to obtain a screened pulp and screened rejects, sending the screened pulp to a screened pulp tower for storage, re-screening the screened rejects to obtain an accepted pulp and tail rejects, reusing the accepted pulp, and collecting the tail rejects for later use, followed by cleaning to obtain a screened and cleaned pulp; wherein the screening refers to selecting and using a pressure screen with a width of 0.2-0.3 mm for a screen slot, wherein a mass percent concentration of the screened pulp is controlled between 0.5%-1%; and adopting two-stage screening, wherein first-stage screened rejects are sent to second-stage screening for secondary screening, the accepted pulp from the second-stage screening enters a pulp feed pump inlet of first-stage screening, and the tail rejects are collected for later use;
   (6) screening of parenchyma cells: removing parenchyma cells and fine fibers from the screened and cleaned pulp using a microporous screen, sending a pulp with parenchyma cells and fine fibers removed to a long fiber pulp tower for storage, and sending a pulp containing parenchyma cells and fine fibers to a parenchyma cell pulp tower for storage and later use; wherein the microporous screen refers to a screen with a diameter between 0.1 and 0.5 mm, a mass percent concentration of the screened pulp is 0.1%-0.5%, the pulp with parenchyma cells and fine fibers removed is sent to the long fiber pulp tower for storage, and the pulp containing parenchyma cells and fine fibers is sent to the parenchyma cell pulp tower for storage and later use;
   (7) oxygen delignification of the pulp with parenchyma cells and fine fibers removed: first concentrating the pulp with parenchyma cells and fine fibers removed, followed by the oxygen delignification to obtain a pulp after the oxygen delignification;
   (8) ECF bleaching of the pulp after the oxygen delignification: performing ECF bleaching treatment of a $D_0EpD_1P$ process on the pulp after the oxygen delignification to obtain bleached pulp, and sending the bleached pulp to a pulp board machine to obtain a bamboo fluff pulp board;
   (9) ultrafiltration of the treatment liquid: treating the replaced treatment liquid obtained in the step (2) by ultrafiltration, obtaining a retentate and a permeate liquid, wherein the retentate is for separating hemicellulose, and continuing to use the permeate liquid for the alkali treatment in the step (1) after the permeate liquid is supplemented with sodium hydroxide; and
   (10) recycling of the tail rejects: using the tail rejects obtained in the step (5) to prepare a tail reject pulp, concentrating and dehydrating the pulp containing parenchyma cells and fine fibers in the step (6) for recycling to obtain a parenchyma cell pulp, and mixing the tail reject pulp with the parenchyma cell pulp to prepare packaging paper.

2. The method for preparing fluff pulp from bamboos according to claim 1, wherein in the step (1), the bamboos are one or more of *Neosinocalamus affinis, Bambusa intermedia, Dendrocalamus membranaceus*, and *Lingnania chungii*.

3. The method for preparing fluff pulp from bamboos according to claim 1, wherein in the step (7), the concentrating refers to increasing a mass percent concentration of the pulp with parenchyma cells and fine fibers removed in the pulp tower to 9%-11%, which is achieved by combining a decker machine and a vacuum pulp washer, a concentrated pulp is sent to a medium concentration pulp tower, and a collected concentrated liquid is sent to a white water tower; and in the step (7), the oxygen delignification refers to delignification of the concentrated pulp under oxygen and alkaline conditions, two-stage oxygen delignification is used, chemicals are added in a first stage, and a process of first-stage oxygen delignification is as follows: a mass percent concentration of the concentrated pulp is 9%-11%, a temperature is 80-100° C., time is 20-30 minutes, oxygen pressure is 0.6-0.8 MPa, a ratio of a dosage of sodium hydroxide to mass of an oven dry pulp is 2%-3%, and a ratio of a dosage of magnesium sulfate to mass of an oven dry pulp is 0.2%-0.4%; and a process of second-stage oxygen delignification is as follows: a mass percent concentration of the pulp is 9%-11%, a temperature is 80-100° C., time is 60-90 minutes, and oxygen pressure is 0.4-0.5 MPa.

4. The method for preparing fluff pulp from bamboos according to claim 1, wherein in the step (8), for the ECF bleaching of $D_0EpD_1P$, $D_0$ refers to first-stage chlorine dioxide bleaching, Ep refers to hydrogen peroxide-enhanced alkaline extraction, $D_1$ refers to second-stage chlorine dioxide bleaching, P refers to hydrogen peroxide bleaching, and ECF refers to an elemental chlorine-free bleaching process; for the $D_0$ bleaching process: a ratio of a dosage of chlorine dioxide to mass of an oven dry pulp is 0.7%-0.8%, a bleaching temperature is 60-70° C., bleaching time is 60-90 minutes, and a system pH is 2-3; for the Ep alkaline extraction process: a ratio of a dosage of hydrogen peroxide to mass of an oven dry pulp is 0.2%-0.4%, a ratio of a dosage of sodium hydroxide to mass of an oven dry pulp is 0.6%-1%, a treatment temperature is 70-90° C., treatment time is 60-90 minutes, and a system pH is 10.5-12; for the $D_1$ bleaching process: a ratio of a dosage of chlorine dioxide to mass of an oven dry pulp is 0.35%-0.4%, a bleaching temperature is 70-80° C., bleaching time is 120-150 minutes, and a system pH is 4-5; and for the P-stage bleaching process: a ratio of a dosage of hydrogen peroxide to mass of an oven dry pulp is 0.7%-1.0%, a ratio of a dosage of sodium hydroxide to mass of an oven dry pulp is 0.1%-0.3%, a bleaching temperature is 70-90° C., bleaching time is 60-90 minutes, and a system pH is 10.5-12, and a mass percent concentration of the pulp treated in each stage is 9%-11%, and after each stage of treatment, pulp washing occurs using a vacuum pulp washer.

5. The method for preparing fluff pulp from bamboos according to claim 1, wherein in the step (9), an ultrafiltration membrane used for the ultrafiltration has a molecular weight cutoff of 1000-5000 Dalton, the treatment liquid is rich in hemicellulose and lignin, the hemicellulose and lignin in the treatment liquid are separated by ultrafiltration, and the permeate liquid is supplemented with sodium hydroxide to achieve a concentration of 60-100 grams NaOH/L permeate liquid before continuing to be used for the alkali treatment in the step (1).

* * * * *